(12) United States Patent
Yonezawa et al.

(10) Patent No.: US 6,761,103 B2
(45) Date of Patent: Jul. 13, 2004

(54) CYLINDER ASSEMBLY

(75) Inventors: Keitaro Yonezawa, Kobe (JP); Gaku Yoshimura, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 7 days.

(21) Appl. No.: 10/353,388

(22) Filed: Jan. 29, 2003

(65) Prior Publication Data
US 2003/0150323 A1 Aug. 14, 2003

(30) Foreign Application Priority Data

Feb. 13, 2002 (JP) .................................... P 2002-034861
May 7, 2002 (JP) .................................... P 2002-131267

(51) Int. Cl.[7] .................................................. B23Q 3/02
(52) U.S. Cl. .............................................. 91/44; 92/27
(58) Field of Search ............................... 92/15, 27, 28, 92/20; 91/41, 44

(56) References Cited

U.S. PATENT DOCUMENTS

| | | | | |
|---|---|---|---|---|
| 3,533,636 A | * | 10/1970 | Firestone et al. | .......... 279/4.07 |
| 4,347,753 A | * | 9/1982 | Claussen et al. | .............. 74/110 |
| 4,699,042 A | * | 10/1987 | Stoll | ............................... 92/27 |
| 5,050,484 A | * | 9/1991 | Kamimura | ...................... 92/27 |
| 5,063,828 A | * | 11/1991 | Kamimura | ...................... 92/27 |
| 5,979,267 A | | 11/1999 | Yonezawa | |

FOREIGN PATENT DOCUMENTS

JP           10-146733 A      6/1998

* cited by examiner

Primary Examiner—Thomas E. Lazo
(74) Attorney, Agent, or Firm—Akin Gump Strauss Hauer & Feld, LLP

(57) ABSTRACT

A first piston (22) of a first locking cylinder (20) descends when a pressure of compressed air in an actuation chamber (23) has exceeded a pressure for locking commencement (P1) and ascends by a first spring (24) when the pressure of the compressed air has decreased to a pressure for releasing commencement (P2). A second advancing and retreating cylinder (32) comprises an inlet chamber (41) and an outlet chamber (45) formed below and above a second piston (35), respectively, and a second spring (46). The actuation chamber (23) communicates with the outside air through the outlet chamber (45). A restricting passage (37) is provided in a route between the actuation chamber (23) and the outside air. The actuation chamber (23) communicates with one of the inlet chamber (41) and the outlet chamber (45) through a communication hole (62).

20 Claims, 5 Drawing Sheets

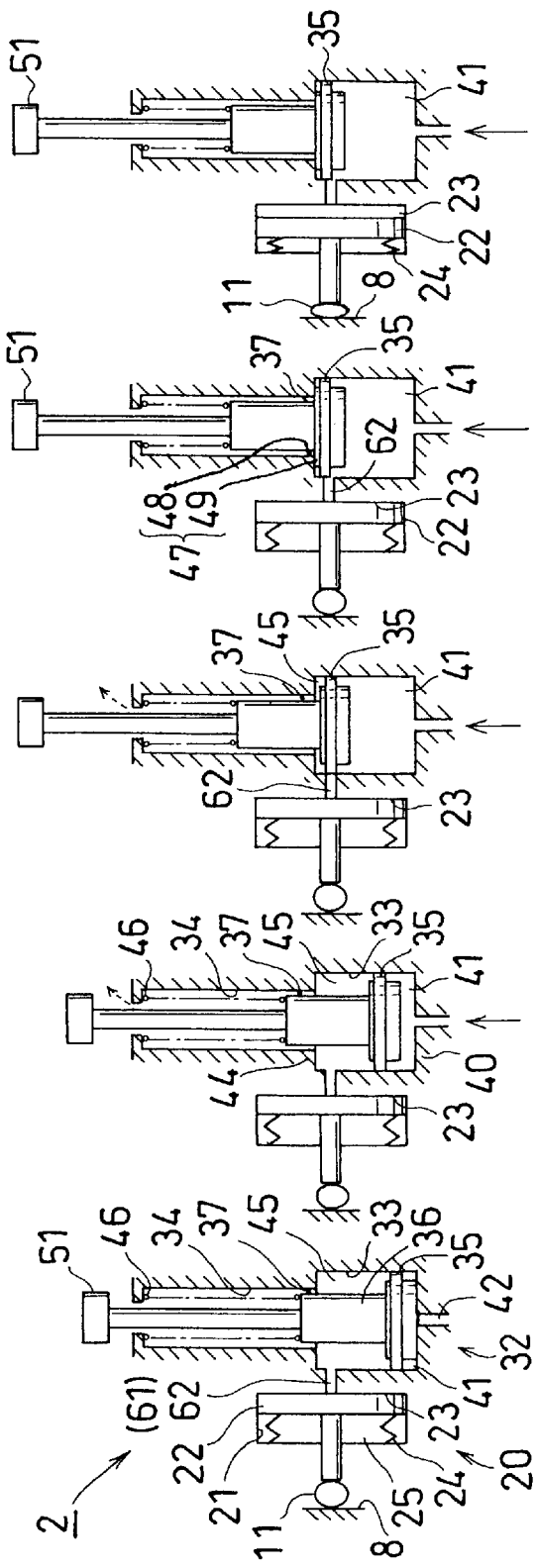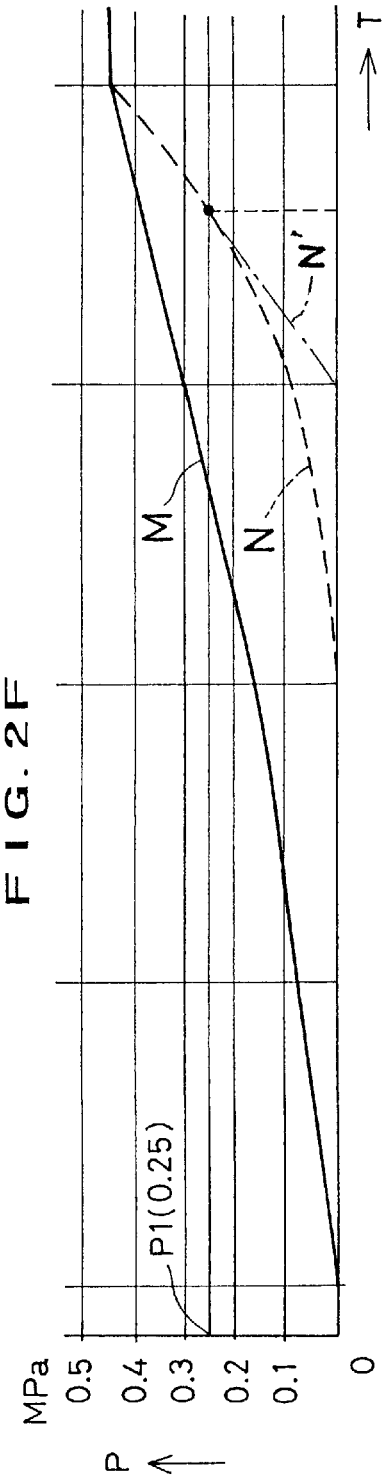

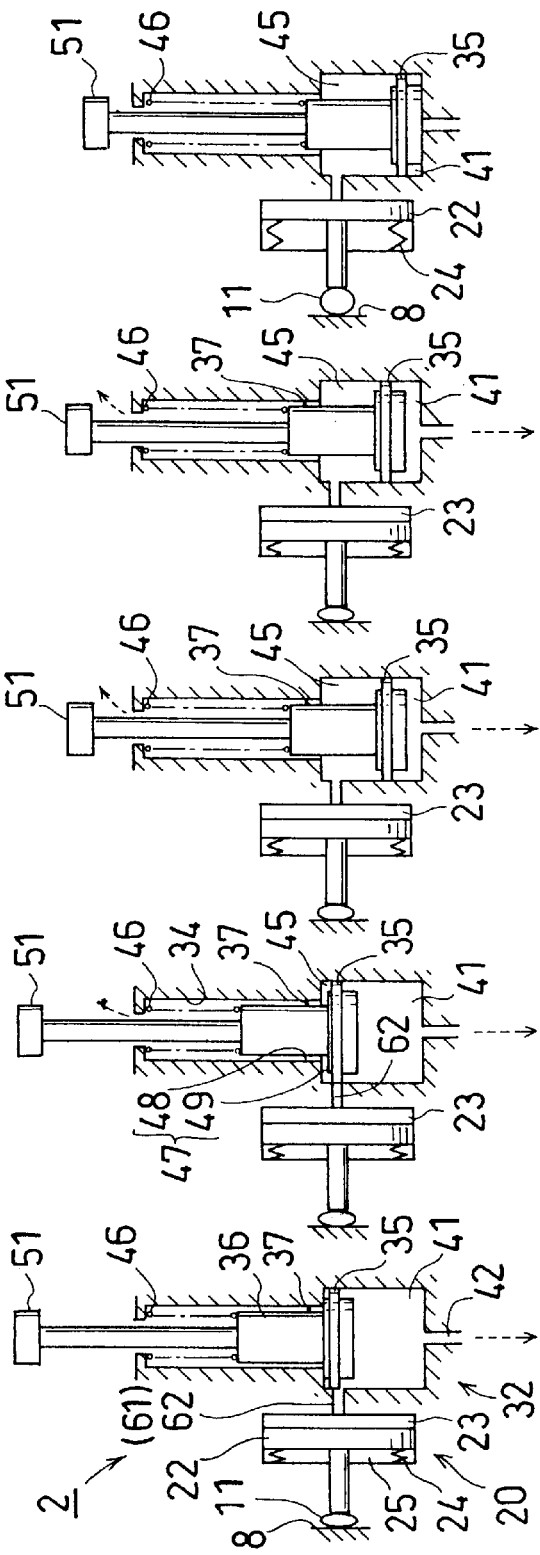
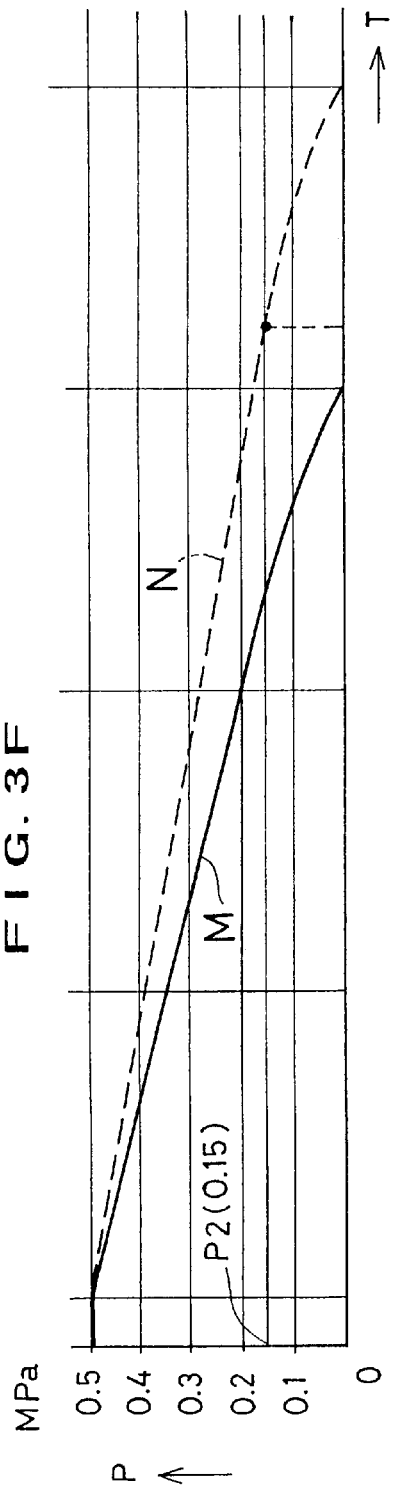

CYLINDER ASSEMBLY

BACKGROUND OF THE INVENTION

1. Field of the Invention

The present invention relates to a cylinder assembly suitably used, for example, for a work support of a machine tool.

2. Explanation of Related Art

For instance, a conventional work support cylinder assembly comprises only one cylinder for working, as disclosed in Japanese Patent Public Disclosure No. 10-146733 proposed by the present inventors (or U.S. Pat. No. 5,979,267 which corresponds to the Japanese publication).

An example of the cylinder assembly of this kind that the present inventors know comprises two cylinders of a working cylinder and an advancing and retreating cylinder, and it operates as follows.

When performing a locking operation, first, an advancing and retreating piston of the advancing and retreating cylinder ascends to bring a support rod into contact with a workpiece by an urging force of an advancing spring. Thereafter, the working cylinder holds and fixes the support rod at a raised position. Further, when making a releasing operation, first, the support rod is cancelled from the condition held and fixed by the working cylinder. Then the advancing and retreating piston descends, thereby enabling the support rod to move down against the urging force of the advancing spring.

The conventional technique which comprises the two cylinders had a problem that when cancelling the support rod from the held and fixed condition, the support rod protrudes up the workpiece by resorting to the urging force of the advancing spring.

SUMMARY OF THE INVENTION

The present invention has an object to provide a cylinder assembly which can solve such a problem as mentioned above.

In order to accomplish the above object, the present invention has constructed a cylinder assembly in the following manner, for example, as shown in FIG. 1, FIGS. 2A to 2F and FIGS. 3A to 3F or in FIGS. 4 to 6.

The cylinder assembly comprises a first working cylinder 20 and an advancing and retreating cylinder 32. The first cylinder 20 performs a locking operation when a gas pressure of an actuation chamber 23 has exceeded a first set pressure (P1) and can make a releasing operation when the gas pressure of the actuation chamber 23 has decreased to a second set pressure (P2) lower than the first set pressure (P1). The second cylinder 32 comprises a second piston 35 fitted into a second cylinder bore 33, an inlet chamber 41 formed between a first end wall 40 of the second cylinder bore 33 and the second piston 35, which pressurized gas is supplied to and discharged from, an outlet chamber 45 formed between a second end wall 44 of the second cylinder bore 33 and the second piston 35, and a return means 46 which retracts the second piston 35 to the first end wall 40. The actuation chamber 23 communicates with the outside air through the outlet chamber 45. A flow resistance applying means (K) is provided in a route between the actuation chamber 23 and the outside air. A changeover means 61 is provided for communicating the actuation chamber 23 with the inlet chamber 41 or the outlet chamber 45. The changeover means 61 communicates the actuation chamber 23 with the outlet chamber 45 during a term from the beginning to the end of an advancing movement of the second piston 35. On the other hand, it communicates the actuation chamber 23 with the inlet chamber 41 at the terminal of the advancing movement of the second piston 35.

The above-mentioned invention operates in the following way, for example, as shown in FIGS. 2A to 2F and in FIGS. 3A to 3F.

When performing the locking operation, pressurized gas such as compressed air is supplied to the inlet chamber 41. Then while the inlet chamber 41 has its pressure (M) increased as indicated by a full line in FIG. 2F, the actuation chamber 23 has its pressure (N) increased in delay from the increase of the pressure (M) of the inlet chamber 41 by an action of the changeover means 61, as shown by a broken line in FIG. 2F. Therefore, first, as shown in FIGS. 2A to 2D, the pressure of the inlet chamber 41 raises the second piston 35 (and an operation member 51 connected to the second piston 35) and then the pressure (N) of the actuation chamber 23 becomes higher than the set pressure (P1), thereby advancing a first piston 22 of the first cylinder 20 to a locking side as shown in FIG. 2E.

Further, when making the releasing operation, the pressurized gas in the inlet chamber 41 is discharged to an exterior area. Then while the pressure (M) of the inlet chamber 41 decreases as indicated by a full line in FIG. 3F, the pressure (N) of the actuation chamber 23 decreases in delay from the decrease of the pressure (M) of the inlet chamber 41 owing to an action of the flow resistance applying means (K), as shown by a broken line in FIG. 3F. Therefore, first, as shown in FIG. 3A to FIG. 3D, the return means 46 lowers the second piston 35 (and the operation member 51) and then the pressure (N) of the actuation chamber 23 becomes lower than the second set pressure (P2), thereby retracting the first piston 22 to a releasing side as shown in FIG. 3E.

In consequence, the present invention offers the following advantage.

When locking, the first cylinder can perform the locking operation after the second piston of the second advancing and retreating cylinder has been advanced. When releasing, the first cylinder can make the releasing operation after the second piston has been retreated.

Accordingly, for example, in the case where the present invention is applied to a work support, at the above releasing time, it is possible to prevent the support rod from protruding up the workpiece by resorting to an advancing means such as the above-mentioned advancing spring.

The present invention includes the following cylinder assembly.

The second cylinder bore 33 has a peripheral surface opened to provide a communication hole 62 which communicates the actuation chamber 23 with an interior area of the second cylinder bore 33. An opening portion of the communication hole 62 and an outer peripheral surface of the second piston 35 constitute the changeover means 61. This invention can form the changeover means 61 into a simple structure with preciseness, which leads to a possibility of putting a reliable cylinder assembly into practice at a low cost.

The present invention includes the following cylinder assembly, for example, as shown in FIGS. 4 to 6.

A sealing member 65 is interposed between the peripheral surface of the second cylinder bore 33 and the outer peripheral surface of the second piston 35. This invention enables the sealing member to assuredly prevent the pressurized gas which has been supplied to the inlet chamber from leaking into the outlet chamber. Thus when supplying the pressurized gas, the pressurized gas can be inhibited from leaking from the outlet chamber to the outside air, which results in reducing the consumption amount of the pressurized gas. Besides, it is possible to prevent the leaked pressurized gas from letting constituent members of the cylinder assembly make some misoperation when supplying the pressurized gas.

The present invention includes the following cylinder assembly, for example, as shown in FIGS. 4 to 6.

The sealing member 65 is attached to the outer peripheral surface of the second piston 35 and forms one part of the changeover means 61. This invention can provide a changeover means which makes a sure operation and has a simple structure.

The present invention includes the following cylinder assembly, for example, as shown in FIGS. 4 to 6.

A restricting passage 66 is provided in the communication hole 62 and forms at least one part of the flow resistance applying means (K). This invention can form the flow resistance applying means into a simple structure with preciseness, which leads to the possibility of putting a reliable cylinder assembly into practice at a low cost.

The present invention includes the following cylinder assembly, for example, as shown in FIGS. 4 to 6.

A fitting clearance 67 defined between the peripheral surface of the second cylinder bore 33 and the outer peripheral surface of the second piston 35 forms at least one part of the flow resistance applying means (K). This invention can form the flow resistance applying means into a simple structure with preciseness, which leads to the possibility of putting a reliable cylinder assembly into practice at a low cost.

The present invention includes the following cylinder assembly, for example, as shown in FIG. 1.

The outlet chamber 45 is communicated in series with a rod hole 34 which has a diameter smaller than that of the outlet chamber 45. A piston rod 36 connected to the second piston 35 is inserted into the rod hole 34 with a predetermined annular clearance 37 interposed therebetween. The annular clearance 37 forms at least one part of the flow resistance applying means (K). This invention can form the flow resistance applying means into a simple structure with preciseness, which leads to the possibility of putting a reliable cylinder assembly into practice at a low cost.

The present invention includes the following cylinder assembly, for example, as shown in FIGS. 1, 2D and 3B.

There is provided a closing portion 47 which shuts off a communication between the outlet chamber 45 and the outside air at the terminal of an advancing movement of the second piston 35. This invention can surely prevent the pressurized gas which has been supplied to the inlet chamber and the actuation chamber from leaking to the outside air at the terminal of the advancing movement of the second piston.

The present invention includes the following cylinder assembly, for example, as shown in FIGS. 1, 2D and 3B.

The closing portion 47 comprises a valve seat 48 provided on the second end wall 44 of the second cylinder bore 33 and a valve face 49 provided on the second piston 35. This invention can form the closing portion into a simple structure with preciseness, which leads to the possibility of putting a reliable cylinder assembly into practice at a low cost.

BRIEF DESCRIPTION OF THE DRAWINGS

FIGS. 1 to 3F show a first embodiment of the present invention;

FIG. 1 is a sectional view when seen in elevation of a work support to which a cylinder assembly is applied;

FIGS. 2A to 2F explain an operation when lock driving the work support;

FIGS. 3A to 3F explain an operation when release driving the work support;

FIG. 4 is a sectional view when seen in elevation of the work support and is similar to FIG. 1;

FIG. 5 shows a second piston provided in the work support in a raised state and is similar to a partial view in FIG. 4; and FIG. 6 shows the second piston while it is descending and is similar to FIG. 5.

DESCRIPTION OF THE PREFERRED EMBODIMENTS

Figure 1:
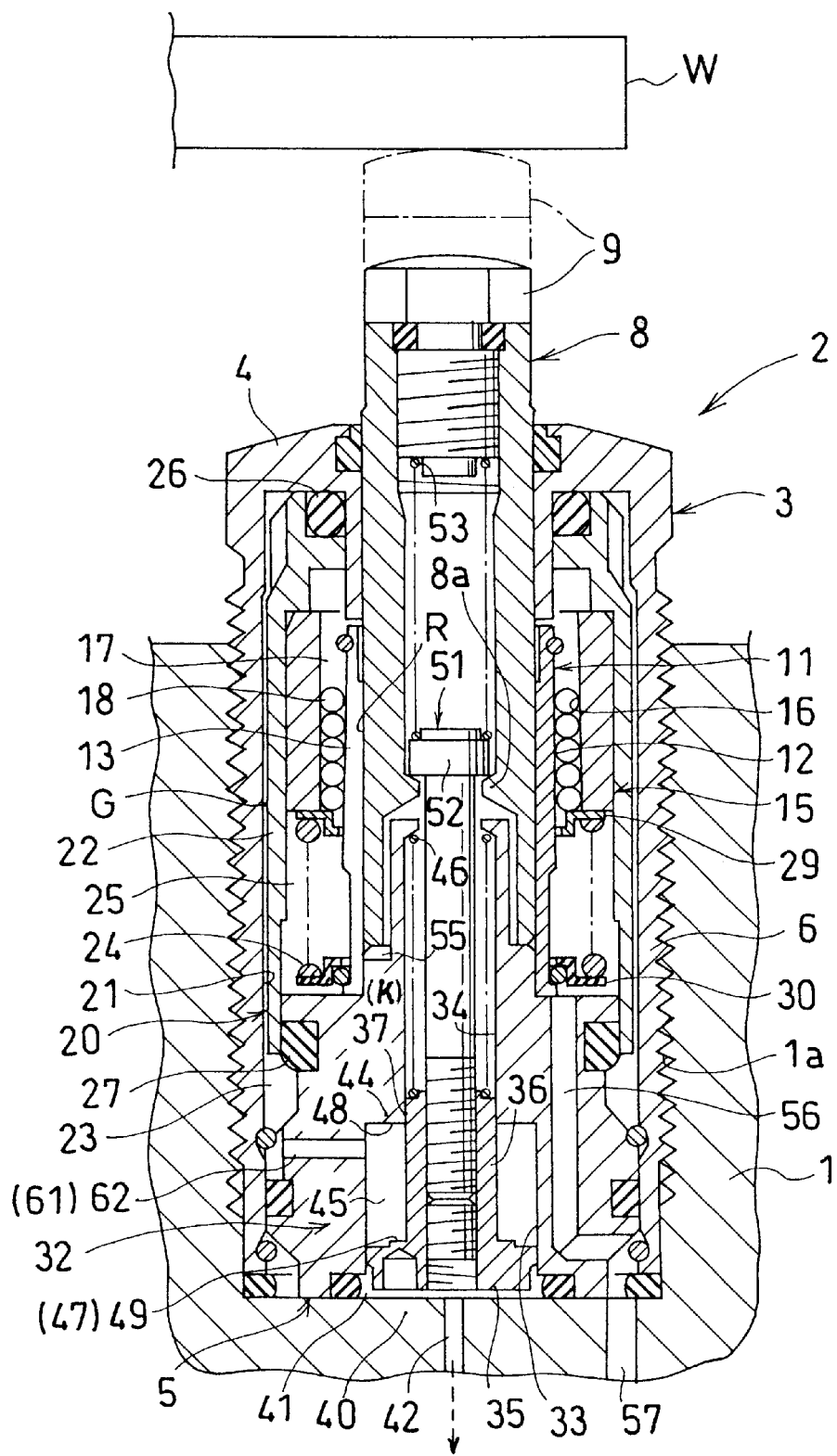

FIG. 1, FIGS. 2A to 2F, and FIGS. 3A to 3F show a first embodiment of the present invention. This first embodiment exemplifies a case where a cylinder assembly of the present invention is applied to a pneumatic work support. First, an explanation is given for a structure of the work support by resorting to a sectional view when seen in elevation of FIG. 1.

A housing 3 of a work support 2 is airtightly attached to an accommodating bore 1a of a work pallet 1 in screw-thread engagement. The housing 3 comprises an upper end wall 4, a lower block 5 defining a lower end wall and a barrel portion 6. A support rod 8 is vertically movably inserted into the housing 3. The support rod 8 has an upper portion provided with a push bolt 9 which is brought into contact with a workpiece (W).

The support rod 8 has an outer peripheral surface provided at its lower half portion with a holding and fixing area (R), onto which a cylindrical collet 11 is externally fitted. The collet 11 has a tapered outer peripheral surface 12 which narrows upwards and makes a diametrical contraction resiliently by a slit 13 which extends vertically. The collet 11 has an outer periphery above which an annular transmission member 15 is arranged. The transmission member 15 has a tapered inner peripheral surface 16 which faces the tapered outer peripheral surface 12 of the collet 11 from above.

A large number of balls 18 are inserted into an annular tapered gap 17 defined between the tapered outer peripheral surface 12 and the tapered inner peripheral surface 16.

A first working cylinder 20 comprises a first cylinder bore 21 formed on an inner periphery of the barrel portion 6 of the housing 3, a first annular piston 22 inserted into a space defined between the first cylinder bore 21 and the transmission member 15, an actuation chamber 23 which lowers the first piston 22, and a first spring 24 which raises the first piston 22. The first spring 24 is attached in a spring chamber 25 below the transmission member 15.

More specifically, the first piston 22 has an upper portion airtightly guided to the upper end wall 4 by a sealing member 26 and has a lower portion airtightly guided to the lower block 5 by another sealing member 27. And by supplying compressed air to the actuation chamber 23, a downward force acts on an annular pressure receiving surface of a larger area which is formed at an upper end of the first piston 22 and an upward force acts on an annular pressure receiving surface of a smaller area which is formed at a lower end of the first piston 22. A differential force between the upward force and the downward force lowers the first piston 22.

The first spring 24 is composed of a compression coil spring here. And it is attached between an upper spring retainer 29 attached to an under surface of the transmission member 15 and a lower spring retainer 30 attached to a lower end of the collet 11. The upper spring retainer 29 receives the large number of balls 18. An urging force of the first spring 24 brings the lower end of the collet 11 into contact with the lower block 5 through the lower spring retainer 30.

A second advancing and retreating cylinder 32 is provided within the lower block 5. The second cylinder 32 is constructed as follows.

In the lower block 5, a second larger-diameter cylinder bore 33 and a smaller-diameter rod hole 34 communicates with each other in series and in an upward direction. A second piston 35 is fitted into the second cylinder bore 33 and a piston rod 36 is inserted into the rod hole 34 with a predetermined annular clearance (restricting passage) 37 interposed therebetween. The annular clearance 37 constitutes at least one part of a flow resistance applying means (K).

The annular clearance 37 is formed larger than a fitting clearance between the second cylinder bore 33 and the second piston 35, but it may be smaller than the piston fitting clearance.

Besides, here, the piston rod 36 is formed integrally with the second piston 35 but it may be formed separately therefrom.

The second cylinder bore 33 has a lower end wall (first end wall) 40 which is defined by a bottom wall of the accommodating bore 1a here. An inlet chamber 41 is formed between the lower end wall 40 and the second piston 35. The inlet chamber 41 communicates with a supply and discharge port 42 through which compressed air is supplied and discharged. An outlet chamber 45 is formed between an upper end wall (second end wall) 44 of the second cylinder bore 33 and the second piston 35. A second spring (return means) 46 which retracts the second piston 35 downwards is attached between an upper end wall of the rod hole 34 and the piston rod 36. The second spring 46 is composed of a compression coil spring here.

There is provided a closing portion 47 which shuts off a communication between the outlet chamber 45 and the annular clearance 37 at the terminal of an advancing movement of the second piston 35. Here the closing portion 47 comprises a valve seat 48 provided on the upper end wall 44 of the second cylinder bore 33 and a valve face 49 provided on an upper end surface of the second piston 35.

The valve face 49 (or the valve seat 48) is preferably defined by a sealing member (not shown) attached to the second piston 35 (or the upper end wall 44). In this case, the sealing member can enhance a sealing function of the closing portion 47.

An operation bolt (operation member) 51 is inserted into the rod hole 34. The operation bolt 51 has a leg portion which is attached to the piston rod 36 in screw-thread engagement. The operation bolt 51 has a head portion 52 which engages with an engaged portion 8a of the support rod 8 from above. In addition, attached between the head portion 52 of the operation bolt 51 and the push bolt 9 is an advancing spring (advancing means) 53 which urges the support rod 8 upwards. The advancing spring 53 is composed of a compression coil spring here.

The annular clearance 37 communicates with the outside air through an interior area of the rod hole 34, a communication groove 55 at an upper side portion of the lower block 5, an interior area of the spring chamber 25, a vertical hole 56 within the lower block 5, and an exhaust hole 57 of the work pallet 1 in the mentioned order.

Moreover, a changeover means 61 is provided to communicate the actuation chamber 23 with one of the inlet chamber 41 and the outlet chamber 45. Speaking it in more detail, a communication hole 62 is formed between the actuation chamber 23 and an upper portion of the second cylinder bore 33. The changeover means 61 is constructed by an opening portion of the communication hole 62 and an outer peripheral surface of the second piston 35.

When lock driving the work support 2, the first cylinder 20 and the second cylinder 32 operate as shown by FIGS. 2A to 2E and FIG. 2F. FIGS. 2A to 2E are schematic views for explaining the operation. FIG. 2F is a graph showing changes of a pressure (M) of the inlet chamber 41 and a pressure (N) of the actuation chamber 23 and schematically illustrates a relationship between the pressure (P) and the time (T).

Under a released condition in FIG. 2A, the compressed air in the actuation chamber 23 is discharged to the exterior area as well as the compressed air in the inlet chamber 41. Therefore, the first piston 22 is retreated by the first spring 24 and the second piston 35 is lowered by the second spring 46. The actuation chamber 23 communicates with the outlet chamber 45.

When switching over the work support 2 from the released condition in FIG. 2A to a locked condition in FIG. 2E, compressed air is supplied from the supply and discharge port 42 to the inlet chamber 41, thereby increasing the pressure (M) of the inlet chamber 41 to a set pressure for locking (here about 0.45 MPa).

The supply of the compressed air to the inlet chamber 41, first, makes the second piston 35 start ascending as shown in FIG. 2B. In this case, the urging force of the second spring 46 or the like is set so that the second piston 35 stars ascending with the pressure (M) of the inlet chamber 41 made lower than a first set pressure (P1) (here about 0.25 MPa) which is a pressure for the actuation chamber 23 to start locking. Besides, in this embodiment, a slight amount of the compressed air in the inlet chamber 41 leaks into the outlet chamber 45 through the fitting clearance between the outer peripheral surface of the second piston 35 and the second cylinder bore 33. However, the leaked out compressed air is smoothly discharged to the exterior area through the annular clearance 37 and the rod hole 34.

Next, as shown in FIG. 2C, when the second piston 35 ascends to the vicinity of a top dead center, the actuation chamber 23 starts communicating with the inlet chamber 41 through the opening portion of the communication hole 62 and therefore the pressure (N) of the actuation chamber 23 commences increasing. The urging force of the second spring 46 or the like is set so that the pressure (M) of the inlet chamber 41 at this time also becomes lower than the first set pressure (P1) (about 0.25 MPa).

Subsequently, as shown in FIG. 2D, when the second piston 35 arrives at the top dead center, the valve face 49 is brought into contact with the valve seat 48 to close the annular clearance 37. At substantially the same time, the communication hole 62 has its opening degree made largest. Thus the pressure (N) of the actuation chamber 23 rapidly increases to exceed the first set pressure (P1) (about 0.25 MPa). This, as shown by FIG. 2E, advances the first piston 22 against the first spring 24 with the pressure of the actuation chamber 23 and the advanced first piston 22 locks the support rod 8 through the collet 11.

When release driving the work support 2, the first cylinder 20 and the second cylinder 32 operate as shown in FIGS. 3A to 3E and FIG. 3F. These FIGS. 3A to 3F are similar to FIGS. 2A to 2F.

When switching over the work support 2 from the locked condition in FIG. 3A to the released condition in FIG. 3E, as shown by FIG. 3A, compressed air in the inlet chamber 41 is discharged to the exterior area via the supply and discharge port 42 to rapidly decrease the pressure (M) of the inlet chamber 41. Then, first, as shown by FIG. 3B, the second spring 46 lowers the second piston 35, thereby separating the valve face 49 from the valve seat 48 and enabling the opening portion of the communication hole 62 to start communicating with the outlet chamber 45. Therefore, the compressed air in the actuation chamber 23 commences being discharged to the exterior area through the communication hole 62, the outlet chamber 45, the annular clearance 37 and the rod hole 34.

Subsequently, as shown by FIG. 3C, the second spring 46 lowers the second piston 35. In this case, the discharge of the compressed air in the actuation chamber 23 to the exterior area is limited by a restricting action of the annular clearance 37, thereby delaying the decrease of the pressure (N) of the actuation chamber 23 from the decrease of the pressure (M) of the inlet chamber 41. In this embodiment, when the second piston 35 descends, the head portion 52 (see FIG. 1) of the operation bolt 51 is brought into contact with the engaged portion 8a (see FIG. 1) of the locked support rod 8 from above. This can assuredly inhibit the support rod 8 from ascending by the urging force of the advancing spring 53 (see FIG. 1).

At this time, since the support rod 8 is locked as mentioned above, the operation bolt 51 and the second piston 35 are inhibited from descending. Thus, first, as shown by FIG. 3D, the inlet chamber 41 has its pressure (M) decreased with the second piston 35 retained at the same height as in FIG. 3C and thereafter the pressure (N) of the actuation chamber 23 becomes lower than the second set pressure (P2) (here about 0.15 MPa) which is a pressure for releasing commencement. This, as shown by FIG. 3E, enables the first piston 22 to retreat by the first spring 24 and cancels the locked condition of the support rod 8 performed by the collet 11. Accordingly, the second piston 35 and the operation bolt 51 further descend by the second spring 46.

An explanation is given for a concrete operation of the work support 2 by resorting to FIG. 1.

Under the released condition shown by FIG. 1, the first piston 22 and the transmission member 15 ascend by the first spring 24, thereby cancelling the diametrical contraction of the collet 11. Further, the second piston 35 and the piston rod 36 descend by the second spring 46, thereby allowing the head portion 52 of the operation bolt 51 to lower the support rod 8 against the advancing spring 53.

Under the above released condition, the workpiece (W) is horizontally carried into an upper position of the push bolt 9. Thereafter, compressed. air is supplied to the inlet chamber 41 through the supply and discharge port 42. Then, first, a pressure of the supplied compressed air starts raising the second piston 35 and the operation bolt 51 against the second spring 46. They are inhibited from ascending over a predetermined distance by the upper end wall 44 of the second cylinder bore 33. Simultaneously with the ascent of the operation bolt 51, the advancing spring 53 raises the support rod 8, thereby bringing the push bolt 9 into contact with the workpiece (W) as indicated by a chain line. In this state, there is vertically formed a contact clearance between an under surface of the head portion 52 of the operation bolt 51 and the engaged portion 8a of the support rod 8.

Next, the above movement of the second piston 35 to the top dead center supplies the compressed air in the supply and discharge port 42 to the actuation chamber 23 through the inlet chamber 41 and the communication hole 62 in order as mentioned above. And when the pressure of the actuation chamber 23 exceeds the aforesaid first set pressure (P1) (here about 0.25 MPa) in FIG. 2F, a vertical differential force of a pneumatic force which acts from the actuation chamber 23 to the first piston 22 moves down the transmission member 15. Then the tapered inner peripheral surface 16 of the transmission member 15 is making a smooth engagement with the tapered outer peripheral surface 12 of the collet 11 while rolling the balls 18 to thereby diametrically contract the collet 11. Thus the diametrically contracted collet 11 pushes the holding and fixing area (R) of the support rod 8 in a centripetal direction to thereby hold and fix the support rod 8 to a height position indicated by a chain line.

The workpiece (W) has its upper surface machined with the support rod 8 locked as above and a push-down force exerted at the machining time is axially and strongly received by a supporting force of the support rod 8.

After the machining has been completed, the compressed air in the inlet chamber 41 is discharged. Then, first, the second piston 35 and the operation bolt 51 descend and the head portion 52 of the operation bolt 51 is brought into contact with the engaged portion 8a of the locked support rod 8 from above. This enables the operation bolt 51 to surely inhibit the support rod 8 from ascending by the advancing spring 53. Thereafter, the locked condition of the support rod 8 is cancelled. More specifically, it is as follows.

If the compressed air is discharged, first, the second spring 46 lowers the second piston 35 and the operation bolt 51. Next, as mentioned above, the compressed air in the actuation chamber 23 is discharged to the exterior area through the communication hole 62, the outlet chamber 45 and the annular clearance 37. And when the actuation chamber 23 has its pressure made lower than the second set pressure (P2) in FIG. 3F (here about 0.15 MPa), the first piston 22 and the transmission member 15 are pushed upwards by the first spring 24. The tapered inner peripheral surface 16 of the transmission member 15 smoothly and upwardly moves while rolling the balls 18 to cancel the pushed condition of the tapered outer peripheral surface 12 of the collet 11. This enables the collet 11 to diametrically expand by its own elastic restoring force and cancel the locked condition of the support rod 8. Therefore, the second piston 35 and the operation bolt 51 further descend to return the support rod 8 to a descent position in FIG. 1.

The first embodiment offers the following advantages.

When release operating the work support 2, first, the operation bolt 51 descends to inhibit the support rod 8 from ascending by the urging force of the advancing spring (advancing member) 53. Thereafter, the support rod 8 is cancelled from the held and fixed condition performed by the collet 11. Therefore, when the held and fixed condition has been cancelled, the urging force of the advancing spring 53 can be prevented from protruding up the workpiece (W) through the support rod 8.

In addition, as mentioned above, in the case where the closing portion 47 is provided with the sealing member (not shown), it is possible to reduce an upward-pressure receiving area at a top dead center position of the second piston 35. Therefore, the second piston 35 commences descending at a stage where the pressure of the inlet chamber 41 (and the outlet chamber 45) is high. This assuredly cancel the locked condition of the support rod 8 after the operation bolt 51 has descended.

The closing portion 47 may comprise a combination of an outer peripheral surface of the second piston 35 with a peripheral surface of the second cylinder bore 33, or the like instead of the combination of the upper end surface of the second piston 35 with the upper end wall 44 of the second cylinder bore 33.

Figure 4:
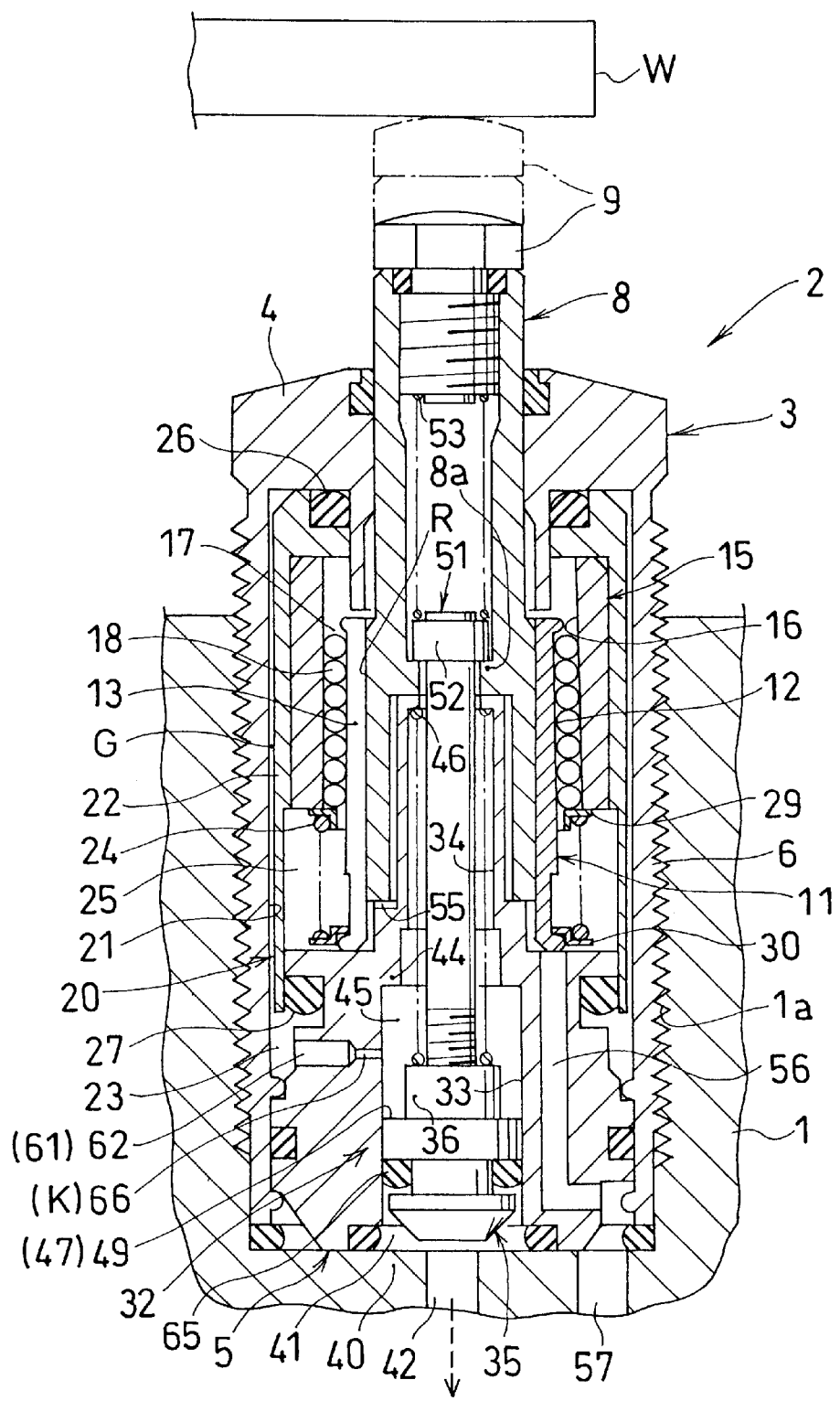
FIGS. 4 to 6 show a second embodiment of the present invention.
Figure 5:
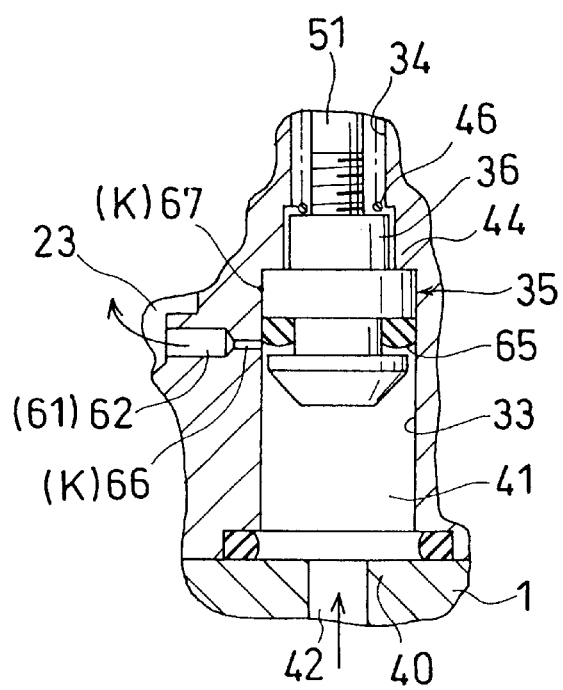
Figure 6:
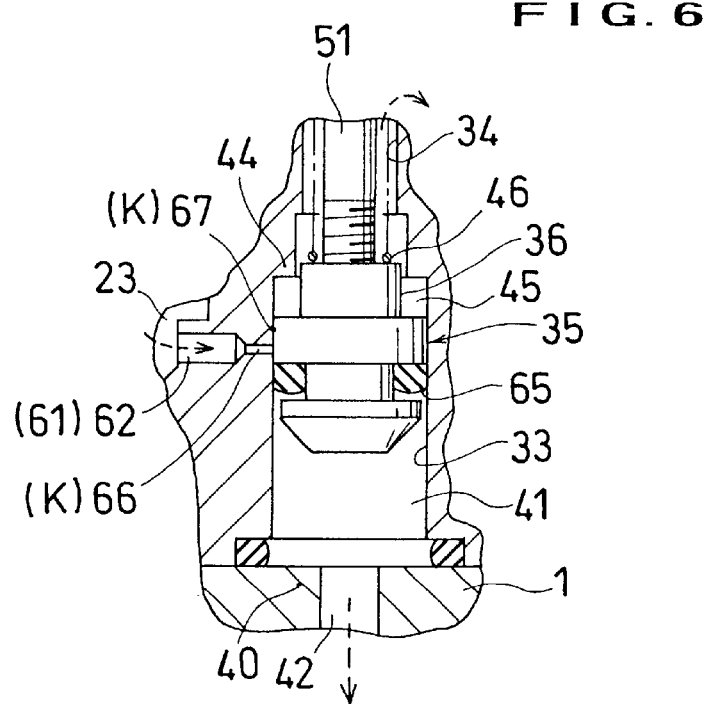

FIGS. 4 to 6 show a second embodiment of the present invention. FIG. 4 is a sectional view when seen in elevation of the work support 2 and is similar to FIG. 1. FIG. 5 shows the second piston 35 raised and is similar to a partial view in FIG. 4. FIG. 6 shows the second piston 35 while it is descending and is similar to FIG. 5.

In this second embodiment, the same constituent members as those of the first embodiment are, in principle, designated by the same reference characters or numerals and an explanation is given for a structure different from that of the first embodiment.

The second piston 35 has the outer peripheral surface to which a sealing member 65 is attached. The second cylinder bore 33 has a halfway height portion opened to provide the communication hole 62. An opening portion of the communication hole 62 and the sealing member 65 constitute the changeover means 61.

And when compressed air is supplied to the inlet chamber 41 under a released condition in FIG. 4, the second piston 35 starts ascending. During a term from the beginning to the end of the ascent of the second piston 35, the sealing member 65 prevents the compressed air in the inlet chamber 41 from flowing into the actuation chamber 23. And when the second piston 35 has reached an ascent position in FIG. 5 (or it has reached just before the ascent), the compressed air in the inlet chamber 41 starts flowing into the actuation chamber 23 through the communication hole 62. This increases the pressure of the actuation chamber 23 as shown by a chain line (N') in FIG. 2F.

Further, the communication hole 62 is provided with a restricting passage 66 which forms at least one part of the flow resistance applying means (K). Besides, defined between a peripheral surface of the second cylinder bore 33 and an outer peripheral surface of an upper half portion of the second piston 35 is a fitting clearance 67 which constitutes at least one part of the flow resistance applying means (K).

And under the condition shown by FIG. 5, when the compressed air in the inlet chamber 41 is discharged to the exterior area through the supply and discharge port 42, the second piston 35 descends. When the second piston 35 has descended to a position shown in FIG. 6, the compressed air in the actuation chamber 23 starts being discharged to the outlet chamber 45 only in a very little amount through the restricting passage 66 and the fitting clearance 67 in the mentioned order and the very little amount of the compressed air is discharged to the exterior area through the rod hole 34.

At this time, the restricting passage 66 and the fitting clearance 67 apply a flow resistance which delays the decrease of the pressure of the actuation chamber 23 to result in delaying the commencement of the ascent of the first piston 22. In consequence, it is possible to delay the commencement of the lock cancellation of the support rod 8 by the first piston 22, which leads to the possibility of performing the lock cancellation of the support rod 8 after the second piston 35 and the operation bolt 51 have descended.

The second embodiment offers the following advantages as well as the above-mentioned advantages offered by the first embodiment.

The sealing member 65 surely prevents the compressed air which has been supplied to the inlet chamber 41 from leaking into the outlet chamber 45. Therefore, when supplying the compressed air, it is possible to prevent the leakage of the compressed air from the outlet chamber 45 to the exterior area, which results in reducing the consumption amount of the compressed air. In addition, the support rod 8 can be prevented from moving up rapidly more than required by the leaked compressed air.

In this second embodiment, the second cylinder bore 33 may have the upper end wall 44 provided with a valve seat (not shown) and the second piston 35 may have an upper portion provided with a valve face (not shown) as well as in the first embodiment. In this case, should the sealing member 65 attached to the second piston 35 be damaged, a closing portion composed of the valve seat and the valve face can surely prevent the compressed air in the actuation chamber 23 from leaking to the exterior air through the rod hole 34 under the condition shown by FIG. 5.

Further, the sealing member 65 may be attached to the second cylinder bore 33 instead of being attached to the second piston 35.

The first and second embodiments are preferably constructed as follows so as to delay the descent commencement and the ascent commencement of the first piston 22.

As shown in FIG. 1 or in FIG. 4, in a state where the first piston 22 is positioned at the top dead center, the first piston 22 has the sealing member 26 brought into contact with the upper end wall 4 as well. In this case, before the first piston 22 starts descending, an annular pressure receiving surface at an upper end of the first piston 22 has so small an area that the first piston 22 starts descending after the pressure of the actuation chamber 23 has been sufficiently increased. And when the first piston 22 descends, thereby separating the sealing member 26 from the upper end wall 4, the annular pressure receiving surface at the upper end of the first piston 22 increases its area to result in strongly pushing down the first piston 22.

Besides, as shown in FIGS. 4 to 6, the communication hole 62 is provided with the restricting passage 66. However, instead or additionally, it is preferable to set an annular clearance (G) defined between the first cylinder bore 21 and the first piston 22 to a small value. In this case, since the annular clearance (G) and the communication hole 62 have their flow resistances made greater, the actuation chamber 23 increases or decreases its pressure over a longer period of time. This delays the descent commencement and the ascent commencement of the first piston 22.

Owing to the above arrangement, it is possible for the first piston 22 to delay the commencement of the locking and the lock cancellation of the support rod 8. Accordingly, after the operation bolt 51 has ascended and descended, the support rod 8 can be locked and lock cancelled assuredly.

The first and second embodiments can be modified as follows.

The flow resistance applying means (K) is sufficient if it employs at least one of the annular clearance 37 in FIG. 1, the restricting passage 66 in FIG. 4 and the fitting clearance 67 in FIG. 6. In addition, it may utilize one part of an exhaust passage such as the above-mentioned communication groove 55 in FIG. 1 or in FIG. 4. Besides, the flow resistance applying means (K) may be an elongated hole, an orifice, a needle valve or the like instead of the annular clearance and the restricting passage.

The changeover means 61 is satisfactory if it communicates the actuation chamber 23 with the inlet chamber 41 or the outlet chamber 45. In consequence, even if there is an instant when the outer peripheral surface of the second piston 35 fully closes the opening portion of the communication hole 62, there is no problem. Or even if there is also an instant when the communication hole 62 communicates with both of the inlet chamber 41 and the outlet chamber 45, there is no problem. Moreover, it is a matter of course that the changeover means 61 is not limited to the combination of the opening portion of the communication hole 62 with the outer peripheral surface of the second piston 35.

The means for advancing the support rod 8 upwards may be rubber or the like resilient member and besides compressed air or the like instead of the exemplified advancing spring 53.

In addition, the means for retracting the second piston 35 downwards may be rubber or the like resilient member and besides compressed air or the like instead of the exemplified second spring 46.

The cylinder assembly of the present invention may be applied to a work support of another structure and besides to a use different from the work support instead of being applied to the work support of the exemplified structure. For instance, instead of the tapered transmission mechanism utilizing the collet 11, there is considered a case where an annular gas actuation chamber is formed on an outer periphery of a thin-walled sleeve and pressurized gas diametrically contracts the thin-walled sleeve to lock a support rod or the like.

What is claimed is:

1. A cylinder assembly comprising:
   a first working cylinder (20) having an actuation chamber (23), and performing a locking operation when a gas pressure of the actuation chamber (23) has exceeded a first set pressure (P1) and making a releasing operation when the gas pressure of the actuation chamber (23) has decreased to a second set pressure (P2) lower than the first set pressure (P1);
   a second advancing and retreating cylinder (32) comprising a second cylinder bore (33) which has a first end wall (40) and a second end wall (44), a second piston (35) fitted into the second cylinder bore (33), an inlet chamber (41) formed between the second piston (35) and the first end wall (40), which pressurized gas is supplied to and discharged from, an outlet chamber (45) formed between the second end wall (44) and the second piston (35) and communicating the actuation chamber (23) with the outside air, and a return means (46) which retracts the second piston (35) to the first end wall (40);
   a flow resistance applying means (K) provided in a route extending from the actuation chamber (23) to the outside air via the outlet chamber (40); and
   a changeover means (61) communicating the actuation chamber (23) with the outlet chamber (45) during a term from the beginning to the end of an advancing movement of the second piston (35) and communicating the actuation chamber (23) with the inlet chamber (41) at the terminal of the advancing movement of the second piston (35).

2. The cylinder assembly as set forth in claim 1, wherein the second cylinder bore (33) has a peripheral surface and the second piston (35) has an outer peripheral surface, the peripheral surface of the second cylinder bore (33) being opened to provide a communication hole (62) which communicates the actuation chamber (23) with an interior area of the second cylinder bore (33), an opening portion of the communication hole (62) and the outer peripheral surface of the second piston (35) constituting the changeover means (61).

3. The cylinder assembly as set forth in claim 2, wherein a sealing member (65) is interposed between the peripheral surface of the second cylinder bore (33) and the outer peripheral surface of the second piston (35).

4. The cylinder assembly as set forth in claim 3, wherein the sealing member (65) is attached to the outer peripheral surface of the second piston (35) and forms one part of the changeover means (61).

5. The cylinder assembly as set forth in claim 4, wherein the communication hole (62) is provided with a restricting passage (66), the restricting passage (66) forming at least one part of the flow resistance applying means (K).

6. The cylinder assembly as set forth in claim 4, wherein there is defined between the peripheral surface of the second cylinder bore (33) and the outer peripheral surface of the second piston (35), a fitting clearance (67) which constitutes at least one part of the flow resistance applying means (K).

7. The cylinder assembly as set forth in claim 4, wherein a piston rod (36) is connected to the second piston (35) and the outlet chamber (45) is communicated in series with a rod hole (34) of a diameter smaller than that of the outlet chamber (45), and the piston rod (36) is inserted into the rod hole (34) with a predetermined annular clearance (37) interposed therebetween, the. annular clearance (37) forming at least one part of the flow resistance applying means (K).

8. The cylinder assembly as set forth in claim 4, wherein there is provided a closing portion (47) which shuts off a communication between the outlet chamber (45) and the outside air at the terminal of the advancing movement of the second piston (35).

9. The cylinder assembly as set forth in claim 3, wherein the communication hole (62) is provided with a restricting passage (66), the restricting passage (66) forming at least one part of the flow resistance applying means (K).

10. The cylinder assembly as set forth in claim 3, wherein there is defined between the peripheral surface of the second cylinder bore (33) and the outer peripheral surface of the second piston (35), a fitting clearance (67) which constitutes at least one part of the flow resistance applying means (K).

11. The cylinder assembly as set forth in claim 3, wherein a piston rod (36) is connected to the second piston (35) and the outlet chamber (45) is communicated in series with a rod hole (34) of a diameter smaller than that of the outlet chamber (45), and the piston rod (36) is inserted into the rod hole (34) with a predetermined annular clearance (37) interposed therebetween, the annular clearance (37) forming at least one part of the flow resistance applying means (K).

12. The cylinder assembly as set forth in claim 3, wherein there is provided a closing portion (47) which shuts off a communication between the outlet chamber (45) and the outside air at the terminal of the advancing movement of the second piston (35).

13. The cylinder assembly as set forth in claim 2, wherein the communication hole (62) is provided with a restricting passage (66), the restricting passage (66) forming at least one part of the flow resistance applying means (K).

14. The cylinder assembly as set forth in claim 2, wherein there is defined between the peripheral surface of the second cylinder bore (33) and the outer peripheral surface of the second piston (35), a fitting clearance (67) which constitutes at least one part of the flow resistance applying means (K).

15. The cylinder assembly as set forth in claim 2, wherein a piston rod (36) is connected to the second piston (35) and the outlet chamber (45) is communicated in series with a rod hole (34) of a diameter smaller than that of the outlet chamber (45), and the piston rod (36) is inserted into the rod hole (34) with a predetermined annular clearance (37) interposed therebetween, the annular clearance (37) forming at least one part of the flow resistance applying means (K).

16. The cylinder assembly as set forth in claim 2, wherein there is provided a closing portion (47) which shuts off a communication between the outlet chamber (45) and the outside air at the terminal of the advancing movement of the second piston (35).

17. The cylinder assembly as set forth in claim 1, wherein there is defined between the peripheral surface of the second cylinder bore (33) and the outer peripheral surface of the second piston (35), a fitting clearance (67) which constitutes at least one part of the flow resistance applying means (K).

18. The cylinder assembly as set forth in claim 1, wherein a piston rod (36) is connected to the second piston (35) and the outlet chamber (45) is communicated in series with a rod hole (34) of a diameter smaller than that of the outlet chamber (45), and the piston rod (36) is inserted into the rod hole (34) with a predetermined annular clearance (37) interposed therebetween, the annular clearance (37) forming at least one part of the flow resistance applying means (K).

19. The cylinder assembly as set forth in claim 1, wherein there is provided a closing portion (47) which shuts off a communication between the outlet chamber (45) and the outside air at the terminal of the advancing movement of the second piston (35).

20. The cylinder assembly as set forth in claim 8, wherein the closing portion (47) comprises a valve seat (48) provided on the second end wall (44) of the second cylinder bore (33) and a valve face (49) provided on the second piston (35).

* * * * *